(12) United States Patent
Dorin

(10) Patent No.: US 12,243,333 B2
(45) Date of Patent: Mar. 4, 2025

(54) METHOD FOR DETERMINING ONE OR MORE STORAGE BOXES FOR STORING OBJECTS

(71) Applicant: Inter IKEA Systems B.V., Delft (NL)

(72) Inventor: Camila Dorin, Lund (SE)

(73) Assignee: Inter IKEA Systems B.V., LN Delft (NL)

( * ) Notice: Subject to any disclaimer, the term of this patent is extended or adjusted under 35 U.S.C. 154(b) by 392 days.

(21) Appl. No.: 17/714,750

(22) Filed: Apr. 6, 2022

(65) Prior Publication Data

US 2022/0327846 A1 Oct. 13, 2022

(30) Foreign Application Priority Data

Apr. 8, 2021 (EP) .................................... 21167446

(51) Int. Cl.
*G06V 20/64* (2022.01)
*G06Q 30/0601* (2023.01)
(Continued)

(52) U.S. Cl.
CPC ......... *G06V 20/64* (2022.01); *G06Q 30/0631* (2013.01); *G06T 7/11* (2017.01);
(Continued)

(58) Field of Classification Search
CPC .... G06V 10/82; G06V 10/764; G06V 10/765; G06V 20/64; G06V 20/647;
(Continued)

(56) References Cited

U.S. PATENT DOCUMENTS 8,682,751 B1 * 3/2014 Antony .................. G06Q 10/08
705/28
10,740,862 B1 * 8/2020 Cui ........................ G06F 30/20
(Continued)

FOREIGN PATENT DOCUMENTS

EP 2843590 A2 3/2015
WO 2020/132627 A1 6/2020

OTHER PUBLICATIONS

Techasarntikul, Nattaon, et al. "Guidance and visualization of optimized packing solutions." Journal of Information Processing 28 (2020): 193-202. (Year: 2020).*
(Continued)

*Primary Examiner* — Scott A Rogers
(74) *Attorney, Agent, or Firm* — Merchant & Gould P.C.

(57) ABSTRACT

The present disclosure relates to a computer implemented method for determining one or more storage boxes for storing objects. The method comprising: scanning, by an imaging sensor, a plurality of objects to be stored thereby acquiring a scan of the plurality of objects; segmenting the scan of the plurality of objects into objects; determining a three-dimensional, 3D, measure of each of the segmented objects; grouping the segmented objects into one or more groups of objects; determining, for a group of objects, one or more candidate storage boxes for storing the objects of the group of objects by calculating a total 3D measure for the objects of the group of objects by combining the 3D measure of each of the objects of the group of objects and comparing the total 3D measure for the objects of the group of objects with inner dimensions of a set of potential storage boxes.

49 Claims, 4 Drawing Sheets

(51) Int. Cl.
*G06T 7/11* (2017.01)
*G06T 7/62* (2017.01)
*G06V 10/764* (2022.01)
*G06V 10/82* (2022.01)
*G06V 20/70* (2022.01)
*G06Q 10/087* (2023.01)

(52) U.S. Cl.
CPC .............. *G06T 7/62* (2017.01); *G06V 10/764* (2022.01); *G06V 10/82* (2022.01); *G06V 20/70* (2022.01); *G06Q 10/087* (2013.01); *G06T 2207/10028* (2013.01); *G06V 2201/10* (2022.01); *G06V 2201/12* (2022.01)

(58) Field of Classification Search
CPC .. G06V 20/653; G06V 20/70; G06V 2201/10; G06V 2201/12; G06F 16/583; G06T 7/10; G06T 7/11; G06T 7/60; G06T 7/62; G06T 2207/10028; G06T 2207/20112; G06Q 10/08; G06Q 10/087; G06Q 30/0631
See application file for complete search history.

(56) References Cited

U.S. PATENT DOCUMENTS

| | | | | |
|---|---|---|---|---|
| 10,938,568 B2* | 3/2021 | Bertsch | ................. | G06V 20/80 |
| 10,970,654 B2* | 4/2021 | Jenkins | ................. | G06Q 10/08 |
| 11,373,138 B2* | 6/2022 | Barr | ................... | G06Q 10/0838 |
| 11,620,591 B2* | 4/2023 | Capoia | ................ | G06Q 10/043 |
| | | | | 705/337 |
| 11,688,028 B2* | 6/2023 | Cui | ........................ | G06Q 10/08 |
| | | | | 703/6 |
| 11,699,128 B2* | 7/2023 | Cui | .................... | G06Q 10/0832 |
| | | | | 703/1 |
| 11,772,833 B1* | 10/2023 | Shi | ............................ | B65B 5/08 |
| | | | | 700/259 |
| 11,907,291 B2* | 2/2024 | Lee | ........................ | G06V 10/40 |
| 2013/0218799 A1* | 8/2013 | Lehmann | ............. | G06Q 10/063 |
| | | | | 705/337 |
| 2020/0117884 A1 | 4/2020 | Adato et al. | | |
| 2020/0242154 A1* | 7/2020 | Haneda | ................. | G06F 16/535 |
| 2021/0179356 A1* | 6/2021 | Chen | ........................ | G06T 7/70 |
| 2023/0306625 A1* | 9/2023 | Peruch | ...................... | G06T 7/60 |

OTHER PUBLICATIONS

Extended European Search Report for EP Application No. 21167446.0 mailed Aug. 31, 2021 (8 pages).

PCT International Search Report and Written Opinion for PCT Application No. PCT/EP2020/059074 mailed Jun. 15, 2022 (13 pages).

* cited by examiner

METHOD FOR DETERMINING ONE OR MORE STORAGE BOXES FOR STORING OBJECTS

CROSS-REFERENCE TO RELATED APPLICATION(S)

This application claims priority to European Patent Application No. 21167446.0 filed on Apr. 8, 2021, the disclosure of which is hereby incorporated by reference in its entirety. To the extent appropriate, a claim of priority is made to the above-disclosed application.

TECHNICAL FIELD

The present disclosure relates to storing of objects. More particularly, it relates to a method for determining what storage box to use for storing one or more objects.

BACKGROUND

In our daily lives, we have a lot of different objects lying around in our homes, for example toys, cables, office supplies, hobby items, books, clothes etc. These objects often lack a designated space or are stored in cluttered spaces. Finding these objects when you need them can be a time-consuming and sometimes near impossible task.

On the market today, there are a wide range of storage solutions. For instance, there are boxes in every imaginable shape, size, material, or color. These types of boxes can be used to organize objects such as the objects of a home. However, finding the right box to store the objects in is not an easy task. It needs to be in the right size, preferably also suitable for the type of objects to be stored in the box. Further, there may be requirements regarding the aesthetics of the boxes.

Finding the right box is not the only aspect of the problem. How to organize the objects between different boxes to easily find them afterwards need also to be solved.

Thus, there is a need for an improved way of storing and organizing objects.

SUMMARY

In view of the above, it is an object of at least some embodiments according to the present disclosure to provide a method for determining one or more storage boxes for storing objects.

It has been realized that by acquiring a digital scan of the objects, the objects can be grouped, and one or more suitable storage boxes can be determined in an easy and time-efficient way. With the help of a device carrying out the method according to the present disclosure, a user can find a set of suitable storage boxes before going to the store. In this way, the user may know which boxes that would satisfy the needs prior to going to the store. In other ways, this can reduce the uncertainty of which boxes would fit or not, and as a result, minimizing the number of returns due to wrong purchases.

According to a first aspect, a computer implemented method for determining one or more storage boxes for storing objects is provided. The method comprising: scanning, by an imaging sensor, a plurality of objects to be stored thereby acquiring a scan of the plurality of objects; segmenting the scan of the plurality of objects into objects; determining a three-dimensional, 3D, measure of each of the segmented objects; grouping the segmented objects into one or more groups of objects; and determining, for a group of objects, one or more candidate storage boxes for storing the objects of the group of objects by calculating a total 3D measure for the objects of the group of objects by combing the 3D measure of each of the objects of the group of objects and comparing the total 3D measure for the objects of the group of objects with inner dimensions of a set of potential storage boxes.

Scanning the plurality of objects may comprise capturing an image of the objects. Alternatively, it may comprise capturing a sequence of images, for instance a video. The sequence of images may be captured from different angles. Put differently, images or sequences of images may be captured from all sides of the plurality of objects. In other words, the scan may comprise one or more images.

The 3D measure of an object may be interpreted as a volume of the object.

A possible associated advantage may be that a correctly sized storage box can be determined without having to physically test it. As suggested above, this allows a user to know which storage boxes will work before buying them. The number of wrong purchases and returns can thus be minimized since the user can avoid buying the wrong sized box, to many boxes, or boxes which doesn't match the home environment of the user. As a result, resources can be saved, both in the sense of financial, environmental and time resources.

The method may further comprise assigning metadata to a segmented object by comparing characteristics of the segmented object with characteristics of objects stored in a database, and upon a positive match, assigning metadata to the segmented object as metadata assigned to the object stored in a database.

The characteristics used to match the segmented object to objects stored in the database may be for example be the 3D measure of the object or aesthetics of the object such as shape or colour.

The comparison between the segmented object and the objects stored in the database may be done by using a neural network. For instance, object recognition may be used to determine if the segmented object is the same as any of the objects in the database.

By assigning metadata to the object, more information about the objects can be obtained which can be used to determine the correct storage box more accurately. It may also be data which in some way help the user to choose the right storage box.

The metadata may comprise information on an 3D measure of the object, wherein the 3D measure of the segmented object is determined from the metadata.

This allows for using more precise 3D measures of known objects which in turn allows for a more precise determination of the total 3D measure.

Another possible associated advantage may be that assigning metadata comprising information on 3D measures of at least one object in the group of objects, allows for using that object with known 3D measure as a scale for determining the 3D measure of objects which are not in the database. In other words, an object with assigned metadata comprising information about its 3D measure may work as a scale in the scan of the objects.

The metadata may comprise information on an object category, and wherein grouping the segmented object into one or more groups of objects may be based on the object category.

Assigning information on the object category may provide for an improved grouping of the objects in terms of a more organized grouping which makes objects easier to find.

The method may further comprise scanning, by a range sensor, the plurality of objects to be stored thereby adding range information to the scan of the plurality of objects, wherein determining a 3D measure of a segmented object may be made based on range information associated with the segmented object.

The range sensor may add extra information to the scan allowing for a more precise determination of the 3D measure of the objects. The range sensor may for instance provide additional information about recesses or bulges in the objects which can be used to pack the objects in a more efficient way.

The step of grouping the objects into one or more groups of objects may comprise categorizing the segmented objects, and grouping the segmented objects belonging to a same object category into a group of objects.

At least some of the segmented objects may be categorized using a neural network trained to categorize objects based on a plurality of images of home environments. The plurality of images of home environments may be selected based on e.g., culture, country, age, family situation or budget related to the user. This may improve the neural network and facilitate a more flexible result based on the selected images which may reflect the individual needs of the user.

The step of determining, for a group of objects, one or more candidate storage boxes for storing the objects of the group of objects may further comprise selecting the set of potential storage boxes from a group of storage boxes based on the object category of the objects in the group of objects and/or an appearance of the boxes of the group of storage boxes.

This may be advantageous in that the potential storage boxes can be narrowed down based on what type of objects are to be stored, and/or based on the appearance of the boxes.

The step of determining, for a group of objects, one or more candidate storage boxes, may further comprise, from a plurality of images of home environments, identifying storage boxes comprising objects corresponding to the objects of the group of objects, wherein the step of selecting the set of potential storage boxes from a group of storage boxes may be based on the identified storage boxes.

In other words, it may be possible to learn information about what boxes can store what objects from images of the home of the user or inspirational images from home decoration tips. This may give better grounds for determining a suitable set of storage boxes. The plurality of images of home environments may be selected based on e.g., culture, country, age, family situation or budget related to the user.

In one embodiment, the plurality of images of home environments used for determining the one or more candidate storage boxes are part of the plurality of images used for training a neural network to perform object categorization.

The one or more candidate storage boxes may comprise a set of different storage boxes each box in the set of different boxes having a different appearance. The method may further comprise, displaying a representation of each of the candidate storage boxes on a display, and receiving user input selecting one or more storage boxes among the candidate storage boxes.

This allows the user to choose from the set of different storage boxes that will fit the one or more objects. Based on the user's decision, an order for the one or more storage boxes may be placed.

The method may further comprise, upon the total volume for the objects of the group of objects is indicative of that the objects of the group of objects does not fit into one storage box, determining that the objects of the group of objects are to be split into a plurality of boxes.

Consequently, the initial grouping may be performed without any limitation as to the size of the group, thereby a more flexible grouping is possible.

The method may further comprise subgrouping the objects of the group of objects into subgroups until each of the subgroups fit into an individual one of the one or more candidate storage boxes.

The method may further comprise displaying on a display a scheme to organize the objects of a group of objects to be stored in a storage box such that they fit into the storage box.

The method may further comprise displaying on a display a representation of the one or more candidate storage boxes having objects of the group of objects stored therein.

According to a second aspect, a non-transitory computer-readable storage medium having stored thereon instructions for implementing the method according to the first aspect, when executed on a device having processing capabilities is provided.

The above-mentioned features and advantages of the first aspect, when applicable, apply to the second aspect as well. To avoid undue repetition, reference is made to the above.

Another aspect is A computer implemented method for determining one or more storage boxes for storing objects, the method comprising: scanning, by an imaging sensor, a plurality of objects, to acquire a scan of the plurality of objects; segmenting the scan of the plurality of objects into segmented objects; determining a three-dimensional (3D) measure of each of the segmented objects; grouping the segmented objects into one or more groups of objects; and determining, for a group of objects of the one or more groups of objects, one or more candidate storage boxes for storing the group of objects by: calculating a total 3D measure for the group of objects by combining the 3D measure of each object of the group of objects; and comparing the total 3D measure for the group of objects with inner dimensions of a set of potential storage boxes.

Yet another aspect is a computing device comprising: an imaging sensor; a processor; a memory device storing instructions which, when executed by the processor cause the computing device to: scan, by the imaging sensor, a plurality of objects to be stored to acquire a scan of the plurality of objects; segment the scan of the plurality of objects into segmented objects; determine a three-dimensional (3D) measure of each of the plurality of objects; calculate a total 3D measure for the plurality of objects; and compare the total 3D measure for the plurality of objects with inner dimensions of a set of potential storage boxes to determine one or more candidate storage boxes for storing the plurality of objects.

Yet another aspect is a non-transitory computer-readable storage medium having stored thereon instructions which, when executed on a device having processing capabilities, cause the device to: scan, by the imaging sensor, a plurality of objects to be stored to acquire a scan of the plurality of objects; segment the scan of the plurality of objects into segmented objects; determine a three-dimensional (3D) measure of each of the plurality of objects; calculate a total 3D measure for the plurality of objects; and compare the total 3D measure for the plurality of objects with inner dimensions of a set of potential storage boxes to determine one or more candidate storage boxes for storing the plurality of objects.

Still other objectives, features, aspects, and advantages will appear from the following detailed description as well as from the drawings. The same features and advantages described with respect to one aspect are applicable to the other aspects unless explicitly stated otherwise.

BRIEF DESCRIPTION OF THE DRAWINGS

The above and other aspects of the present inventive concept will now be described in more detail, with reference to appended drawings showing variants of the invention. The figures should not be considered limiting the invention to the specific variant; instead they are used for explaining and understanding the inventive concept.

As illustrated in the figures, the sizes of layers and regions are exaggerated for illustrative purposes and, thus, are provided to illustrate the general structures of variants of the present inventive concept. Like reference numerals refer to like elements throughout.

DETAILED DESCRIPTION

The present inventive concept will now be described more fully hereinafter with reference to the accompanying drawings, in which currently preferred variants of the inventive concept are shown. This inventive concept may, however, be implemented in many different forms and should not be construed as limited to the variants set forth herein; rather, these variants are provided for thoroughness and completeness, and fully convey the scope of the present inventive concept to the skilled person.

A computer implemented method 100 for determining one or more storage boxes for storing objects will now be described with reference to FIG. 1 to FIG. 3.

Figure 1:
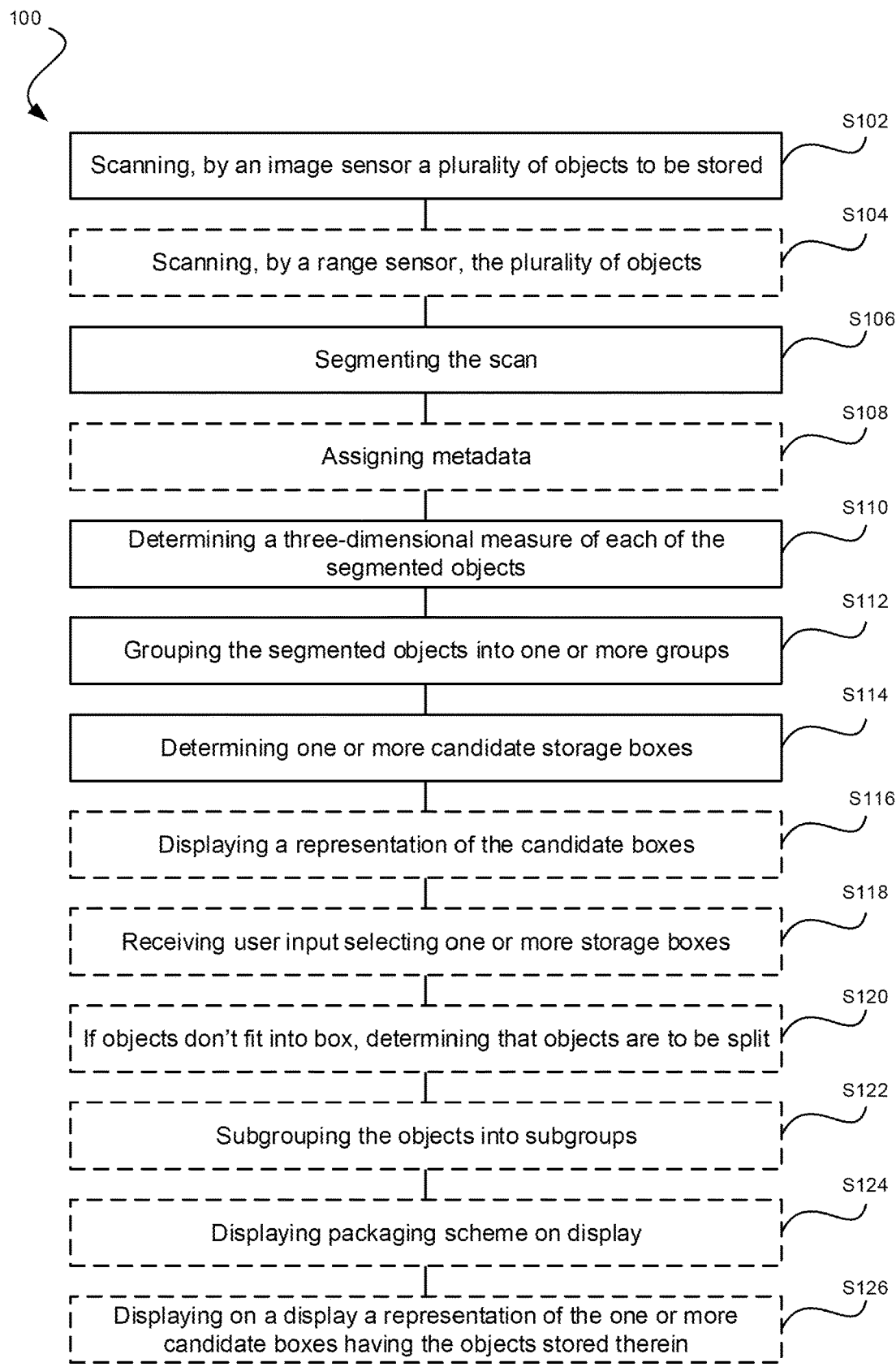
FIG. 1 is a flow chart illustrating the steps of a computer implemented method for determining one or more storage boxes for storing objects.

FIG. 1 is a flow chart illustrating the steps of the method 100. Below, the different steps is described in more detail. Even though illustrated in a specific order, the steps of the method 100 may be performed in any suitable order, as well as multiple times.

A plurality of objects 202 to be stored are scanned S102 by an imaging sensor 302, thereby acquiring a scan of the plurality of objects 202. The imaging sensor 302 may for instance be a camera. The imaging sensor may be part of a user device 300, which is further discussed in connection with FIG. 3. The user device 300 may further comprise a display 304. The user device 300 may be any suitable device having a camera and a display 304. For example, the user device 300 may be a handheld device such as a smartphone or tablet. As another example, the user device 300 may be a wearable device, such as smart glasses. The user device 300 may carry out the computer implemented method 100 locally. Alternatively, the user device may communicate with an external server 400 which may carry out parts of the method 100. The server 400 is further discussed in connection with FIG. 4.

The term scanned may be interpreted as capturing an image of the plurality of objects 202. Alternatively, it may be interpreted as capturing a sequence of images, or video of the plurality of objects 202 from a plurality of angles. Thus, the scan may comprise one or more images. Multiple images of the objects may be combined to create a 3D reconstruction of the objects. The plurality of objects 202 may be scanned together. The plurality of objects 202 may be scanned individually. In case there are multiple occurrences of one object, the object may only have to be scanned in detail once. Instead, a simpler comparison against the already scanned object may be performed.

The plurality of objects 202 to be stored may further be scanned S104 by a range sensor 306. Thereby, range information may be added to the scan of the plurality of objects 202. The range sensor 306 may be e.g. a 3D scanner, Laser rangefinder, Lidar, Light-field camera (plenoptic camera), Time-of-flight camera, Laser Dynamic Range Imager, Structured-light 3D scanner, Coded aperture scanner or mmWave radar sensor.

The scan of the plurality of objects 202 are segmented S106 into objects. Put differently, the scan may be partitioned into the individual objects. The segmentation may be performed using computer vision algorithms, for example edge detection. As another example, deep learning-based approaches, such as Mask R-CNN, may be used for the segmentation. For range information, clustering algorithms may be used for achieving the segmentation. As an example, K-means clustering may be used. However, any type of suitable segmentation algorithms may be used.

A three-dimensional, 3D, measure of each of the segmented objects are determined S110. The 3D measure may be determined based on the scan by the imaging sensor 302. Alternatively, or in combination, it may be based on range information associated with the segmented object acquired by the range sensor 306. The 3D measure may for instance be determined using computer vision algorithms.

As an example, the 3D measure may be the maximum dimensions of the segmented object along the three dimensions. In other words, the size of the smallest possible cuboid in which the object could fit. As another example, the 3D measure may be a more detailed 3D representation of the 3D features of the object.

Metadata may be assigned S108 to a segmented object. This may be done by comparing characteristics of the segmented object with characteristics of objects stored in a database. Upon a positive match, metadata which are assigned to the object in the database may be assigned to the segmented object. For example, the scan data pertaining to a segmented object may be sent to an external server 400, an upon a positive match, the device 300 receives the metadata corresponding to the segmented object from the server 400.

The characteristics used to match segmented objects with objects of the database may be any characterizing feature of the objects, such as the size, shape, or color of the objects. The characteristics may also be a product label or other labels attached to the objects, such as a QR code.

As an example, object recognition algorithms may be used to compare segmented objects with the database of objects.

The metadata may comprise information on a 3D measure of the object. The 3D measure of the segmented objects may be determined from the metadata assigned to the segmented objects. In other words, 3D measures of segmented objects which is known from the database can be determined with the help of metadata stored in the database.

The metadata may comprise information on an object category. The object category may be objects belonging to a specific type of room, e.g. kitchen, bathroom, living room, bedroom, kids' playroom etc. Alternatively, the object category may be objects of similar size. Alternatively, the object category may be objects of the same type, e.g. books, blankets, pillows, CDs, office supplies, etc.

The metadata may comprise a 3D representation of the objects in the database.

The segmented objects are grouped S112 into one or more groups of objects. The segmented objects may be grouped S112 based on size. For instance, in the case of multiple groups, objects with large 3D measures may be distributed over the different groups. Alternatively, the segmented objects may be grouped S112 based on what type of object it is. For instance, toys may be grouped into one group, while office supplies may be grouped in another group. Grouping S112 the segmented objects into one or more groups of objects may be based on the object category of the metadata.

Grouping S112 the objects into one or more groups of objects may comprise categorizing the segmented objects, and grouping the segmented objects belonging to a same object category into a group of objects. The categorization may be made based on the metadata. Alternatively, the categorization may be based on object categorization algorithms and/or image search algorithms.

At least some of the segmented objects may be categorized using a neural network. The neural network may be trained to categorize objects based on a plurality of images of home environments. For instance, the neural network may be trained on a set of inspirational images of the potential set of storage boxes. The inspirational images may show examples of the potential set of storage boxes in use, i.e. with different objects stored inside.

One or more candidate storage boxes are determined S114 for a group of objects, for storing the objects of the group of objects, by calculating a total 3D measure for the objects of the group of objects and comparing the total 3D measure for the objects of the group of objects with inner dimensions of a set of potential storage boxes. A storage box of the set of potential storage boxes may be determined to be a candidate storage box if the inner dimensions of the box is equal to or larger than the total 3D measure of the objects to be stored in the box.

The total 3D measure may be calculated by combining the 3D measure of each of the objects of the group of objects. The individual 3D measured of the objects may be combined when the objects are in a configuration which gives a minimal total 3D measure. In other words, the 3D measures of the objects are combined into the total 3D measure in a way which gives the smallest possible total 3D measure and/or such that it fits at least one of the potential storage boxes.

The combining of 3D measures may involve using a packaging optimization algorithm to combine the individual 3D measures in an optimal way. For instance, the objects may be combined such that they are packed as densely as possible. Alternatively, the objects may be combined such that as few storage boxes as possible are needed. In another example, the objects may be packed from largest to smallest. In other words, the objects may be combined in an order based on their individual 3D measures.

Determining S114, for a group of objects, one or more candidate storage boxes for storing the objects of the group of objects may further comprise selecting the set of potential storage boxes from a group of storage boxes based on the object category of the objects in the group of objects and/or an appearance of the boxes of the group of storage boxes. In other words, the potential storage boxes may be narrowed down based on the object category and/or and appearance of the box.

As a non-limiting example, if the group of objects are objects related to bathrooms, the set of potential storage boxes may be limited to storage boxes suitable for bathroom environments. The storage boxes may be suitable in the sense of aesthetics and/or function.

The appearance of the boxes may for instance be dimension, shape, colour, material, or function.

Determining S114, for a group of objects, one or more candidate storage boxes, may further comprise, from a plurality of images of home environments, identify storage boxes comprising objects corresponding to the objects of the group of objects. The step of selecting the set of potential storage boxes from a group of storage boxes may be based on the identified storage boxes. In other words, candidate storage boxes may be determined based on example images of the storage boxes containing objects which corresponds to the objects which are to be stored in the boxes. In other words, a storage box which often can be seen to hold a certain object can be suggested in that certain object corresponds to the objects to be stored.

Corresponding objects may for instance be interpreted as objects belonging to the same object category or object type. Hence, they may not necessarily be the same object. For example, toy cars and teddy bears are both toys which may belong to the same object category.

The images of home environments may be scans from different houses or inspirational images for home decoration purposes. The images of home environments may be scans from the users own home. For instance, the user may already have a set of boxes to which the user wants to find similar ones.

The plurality of images of home environments used for determining the one or more candidate storage boxes may be part of the plurality of images used for training a neural network to perform object categorization. An associated advantage may be that using overlapping sets of images may improve the algorithm or neural network and facilitate a more flexible result based on selected images. The images may be selected to represent e.g. culture, country, age, family situation or budget related to the user.

The one or more candidate storage boxes may comprise a set of different storage boxes. Each box in the set of different boxes may have a different appearance.

The method 100 may further comprise displaying S116 a representation of each of the candidate storage boxes on a display 304. The display 304 may be a display 304 on the same device 300 used to scan the objects. The representation of the candidate storage boxes may be an image of the boxes in an empty state. Alternatively, the storage boxes may be displayed in the home environment by using augmented reality (AR). Displaying the storage boxes in the home environment 200 allows the user to see what the storage boxes will look like in that environment 200. The storage boxes may be displayed with the objects of the group of objects stored therein. For objects having assigned metadata including a 3D representation of the object, the 3D representation may be used to display the object in AR.

The method 100 may further comprise receiving S118 user input selecting one or more storage boxes among the candidate storage boxes. The user may be presented with an option to purchase the one or more selected storage boxes.

This may be done by displaying on the display 304 an interface for placing a purchase order for the selected one or more storage boxes.

Upon the total volume for the objects of the group of objects is indicative of that the objects of the group of objects does not fit into one storage box, the method 100 may comprise determining S120 that the objects of the group of objects are to be split into a plurality of boxes. The total volume may be the total 3D measure.

The objects of the group of objects may be sub-grouped S122 into subgroups until each of the subgroups fit into an individual one of the one or more candidate storage boxes.

A user input may be received indicating a maximum and/or minimum size of the storage boxes. The group of objects may be sub-grouped until each of the sub-groups fit into an individual candidate storage box within the user specified interval.

On a display, a scheme to organize the objects of a group of objects to be stored in a storage box such that they fit into the storage box may be displayed S124. The scheme may be how and in what order the objects should be put into the storage box. The scheme may follow a packaging algorithm. For example, the objects may be placed from largest to smallest. In another example, the objects may be placed in the storage box by altering smallest and largest objects.

The scheme may be displayed as an animation showing the user how to pack the objects. The animation may for example be the objects falling down into the storage box in the order according to the packaging scheme. The objects falling down may be simulated by a physics engine. The user may further be able to give the objects a shake by shaking the device, and then allowing the objects to settle. As another example, an exploded view of the objects packed in the storage box may be displayed. In a further example, the objects may be shown inside the storage box by having the storage box illustrated as semi-transparent.

A representation of the one or more candidate storage boxes may be displayed S126 on the display 304 having objects of the group of objects stored therein.

Figure 2:
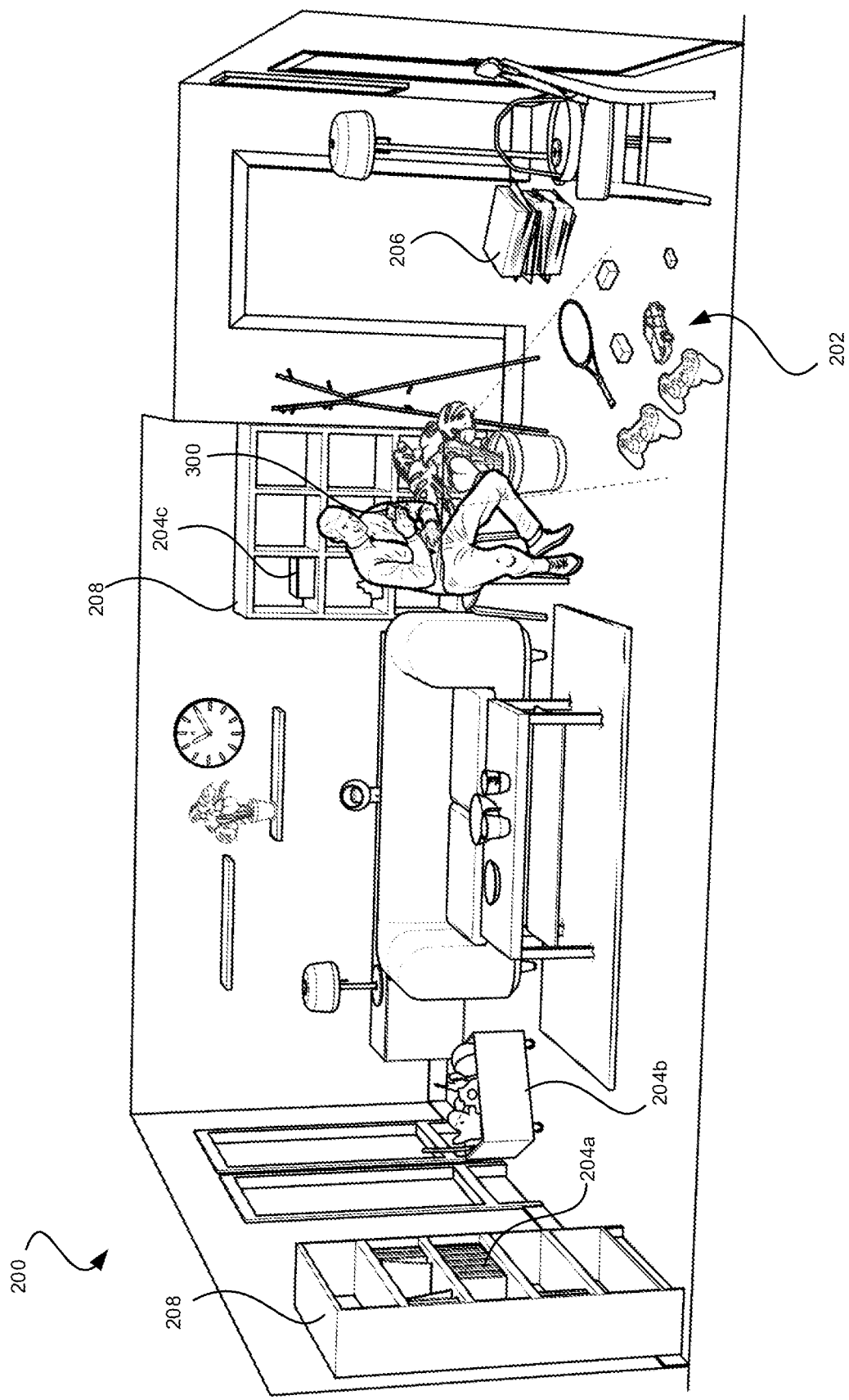
FIG. 2 shows an environment in which the method may be carried out by a user.

FIG. 2 illustrates, by way of example, an environment 200 in which the method 100 may be carried out. The method 100 may be carried out by a user using a user device 300 comprising the implemented method 100.

The environment 200 is herein illustrated as a living room of a home of the user. However, the method 100 may be carried out in other types of home environments as well. For example, the environment 200 may be a bedroom, a bathroom, a kitchen, a kid's playroom etc. Further, the method 100 may be carried out at other places than at home, for example at work.

A plurality of objects 202 which are to be stored is shown. The plurality of objects 202 may comprise objects of different object types which the user may want to store in one or more storage boxes 204a, 204b, 204c. The storage boxes 204a, 204b, 204c may be of different types, sizes, colours etc. The storage boxes 204a, 204b, 204c illustrates herein are to be regarded as non-limiting examples for giving an idea of what type of boxes that may be determined. The storage boxes may for instance be magazine files 204a for organizing magazines or papers, or boxes for storing toys 204b.

The user may scan the plurality of objects 202. The user can scan the plurality of boxes for instance by walking around the objects to obtain a sequence of images of the objects from different angles. Or by taking one or more pictures of them. On the display of the user device 300, the user may then be presented with one or more candidate boxes for one or more groups of objects. In the illustrates example, the video game controllers of the plurality of objects 202 may for instance be grouped into one group because they belong together. While the rest of the objects may be grouped into one or more additional groups. The user may then be presented with one or more candidate boxes for each group of objects.

Further illustrated in FIG. 2 is a pile of magazines 206 as a further example of objects to be stored. The user may choose to scan the magazines 206 in another scan. The user may then be suggested a number of storage boxes, for instance magazine files 204a, which will fit the magazines.

The environment 200 as illustrated in FIG. 2 further provides an example of a home environment which may be used to train the neural network for categorizing segmented objects. Images of the environment 200 may also be used to identify storage boxes comprising objects corresponding to the object of the group of objects to which one or more candidate storage boxes is to be determined. For example, the box of toys 204b may be identified from which the same box may be suggested to store objects of the plurality of objects 202 which are toys. Further, from images of the environment 200, shelves 208 may be determined. The step of selecting the set of potential storage boxes from a group of storage boxes may be based on the size of identified shelves. Put differently, the suggested boxes may be limited to boxes which fits the shelves 208.

Figure 3:
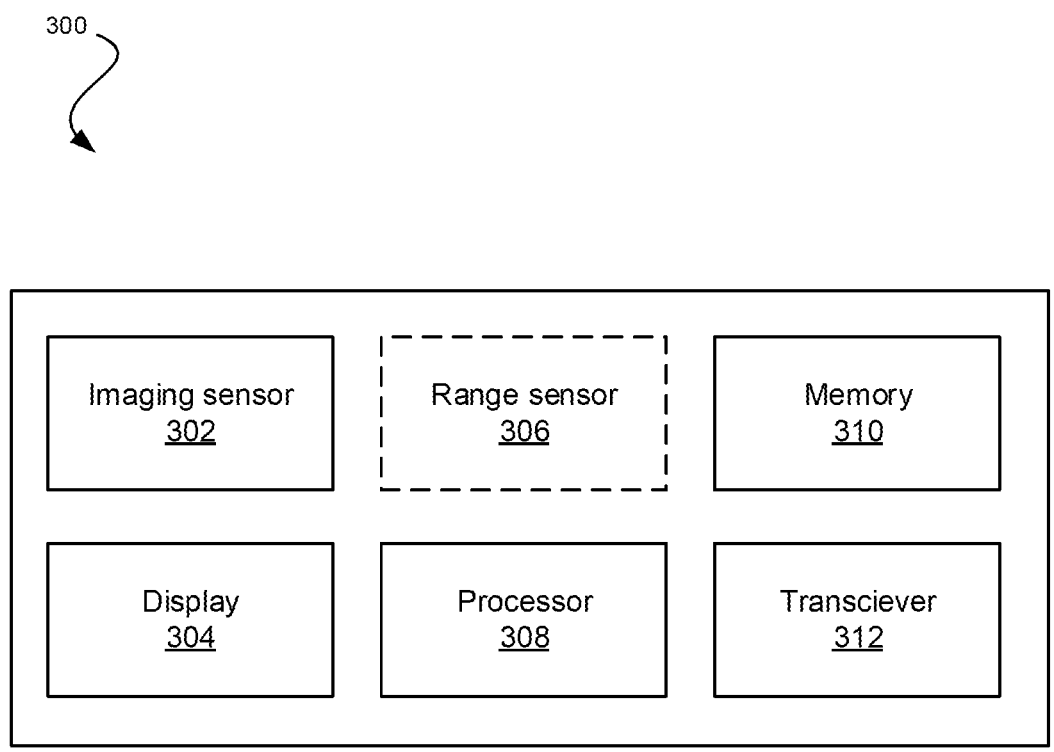
FIG. 3 illustrates a device configured to execute at least parts of the computer implemented method of FIG. 1.

FIG. 3 schematically illustrates, by way of example, the user device 300. As mentioned above, the user device 300 may comprise an imaging sensor 302. The imaging sensor may be a camera. The device 300 may further comprise a display 304. The device 300 may further comprise a range sensor 306 for acquiring range information about an object being scanned. The device 300 may comprise a memory 310. The memory 310 may have stored thereon instructions for implementing the method according to the present disclosure. The memory 310 may be one or more of a buffer, a flash memory, a hard drive, a removable media, a volatile memory, a non-volatile memory, a random access memory (RAM), or another suitable device. Computer readable instructions stored on the memory 310 may be executed by a processor 308 of the device 300 such that the method is carried out. The device 300 may comprise a transceiver 312 for allowing the device 300 to communicate with other devices. The device 300 may for instance communicate with an external database comprising metadata of objects stored in the database.

The skilled person would understand that the user device 300 may comprise other components as well, such as components which are normally found in smartphones or tablets.

Figure 4:
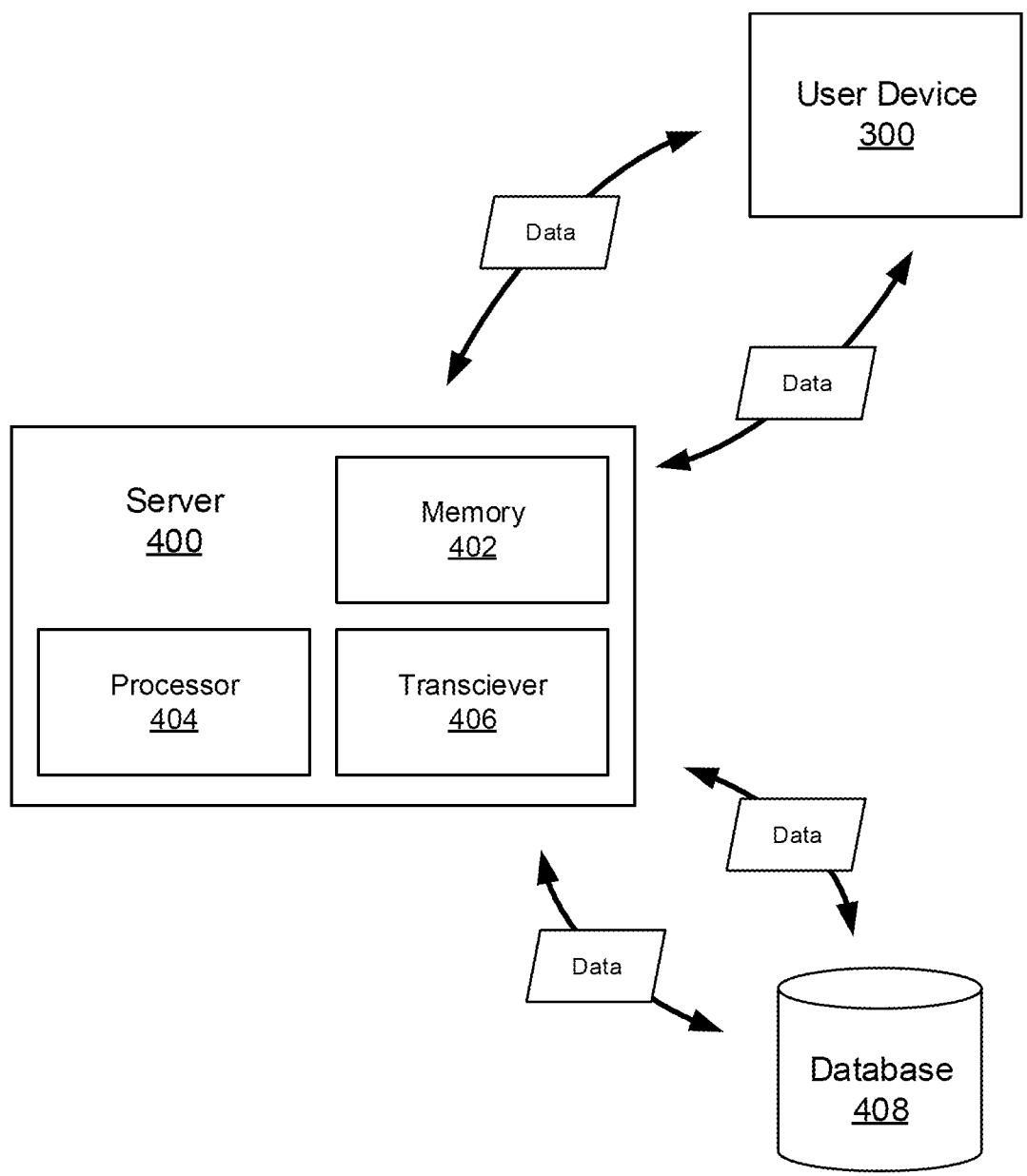
FIG. 4 illustrates a server communicating with a device, the server configured to execute at least part of the computer implemented method of FIG. 1.

FIG. 4 schematically illustrates, by way of example, a server 400 which may be configured to execute at least parts of the method 100. The server 400 may comprise a memory 402. The memory 402 may have stored thereon instructions for implementing the at least parts of the method 100. The memory 402 may be one or more of a buffer, a flash memory, a hard drive, a removable media, a volatile memory, a non-volatile memory, a random access memory (RAM), or another suitable device. Computer readable instructions stored on the memory 402 may be executed by a processor 404 of the server 400 such that the method is carried out. The server 400 may comprise a transceiver 406 for allowing the server 400 to communicate with other devices. The server 400 may for instance communicate with the user device 300 described above to transmit data between them. The server 400 may communicate with an external database 408 comprising above described metadata of objects stored in the database as well as other data relating to the objects. Alternatively, the database 408 comprising metadata may be provided within the server 400.

Additionally, variations to the disclosed variants can be understood and effected by the skilled person in practicing the claimed invention, from a study of the drawings, the disclosure, and the appended claims.

What is claimed is:

1. A computer implemented method for determining one or more storage boxes for storing objects, the method comprising:
   scanning, by an imaging sensor, a plurality of objects, to acquire a scan of the plurality of objects;
   segmenting the scan of the plurality of objects into segmented objects;
   assigning metadata to a segmented object, wherein to assign the metadata to the segmented object includes to:
      compare characteristics of the segmented object with characteristics of objects stored in a database, and
      upon a positive match, assign the metadata to the segmented object and storing the metadata as assigned to the segmented object in the database, wherein the metadata comprises information on a 3D measure of an object;
   determining a three-dimensional (3D) measure of each of the segmented objects, wherein the 3D measure of the segmented object is determined from the metadata;
   grouping the segmented objects into one or more groups of objects; and
   determining, for a group of objects of the one or more groups of objects, one or more candidate storage boxes for storing the group of objects by:
      calculating a total 3D measure for the group of objects by combining the 3D measure of each object of the group of objects; and
      comparing the total 3D measure for the group of objects with inner dimensions of a set of potential storage boxes.

2. The method according to claim 1, wherein the metadata comprises information on an object category, and grouping the segmented object into the one or more groups of objects is based on the object category.

3. The method according to claim 1, further comprising:
   scanning, by a range sensor, the plurality of objects to be stored thereby adding range information to the scan of the plurality of objects,
   wherein determining the 3D measure of a segmented object is further made based on the range information associated with the segmented object.

4. The method according to claim 1, wherein grouping the objects into the one or more groups of objects further comprises:
   categorizing the segmented objects; and
   grouping the segmented objects belonging to a same object category into one of the one or more groups of objects.

5. The method according to claim 4, wherein at least some of the segmented objects are categorized using a neural network trained to categorize objects based on a plurality of images of home environments.

6. The method according to claim 4, wherein determining the one or more candidate storage boxes further comprises:
   selecting the set of potential storage boxes from a group of storage boxes based on the object category of the objects in the group of objects and/or an appearance of boxes of the group of storage boxes.

7. The method according to claim 1, wherein determining the one or more candidate storage boxes further comprises:
   identifying storage boxes comprising objects corresponding to the group of objects from a plurality of images of home environments,
   wherein the set of potential storage boxes is selected from a group of storage boxes based on the identified storage boxes.

8. The method according to claim 1, wherein the one or more candidate storage boxes comprises a set of different storage boxes, each box in the set of different boxes having a different appearance, the method further comprising:
   displaying a representation of each of the one or more candidate storage boxes on a display; and
   receiving user input selecting at least one storage box among the one or more candidate storage boxes.

9. The method according to claim 1, the method further comprising:
   calculating a total volume for the group of objects;
   determining whether the group of objects fits into one storage box based on the total volume for the group of objects; and
   splitting the group of objects into a plurality of boxes when it is determined that the group of objects does not fit into the one storage box.

10. The method according to claim 9, further comprising:
   subgrouping the group of objects into subgroups until each of the subgroups fit into an individual one of the one or more candidate storage boxes.

11. The method according to claim 1, further comprising:
   displaying on a display a scheme to organize the group of objects to be stored in a storage box such that they fit into the storage box.

12. The method according to claim 1, further comprising:
   displaying on a display a representation of the one or more candidate storage boxes having objects of the group of objects stored therein.

13. A computing device comprising:
   an imaging sensor;
   a processor;
   a memory device storing instructions which, when executed by the processor cause the computing device to:
      scan, by the imaging sensor, a plurality of objects to be stored to acquire a scan of the plurality of objects;
      segment the scan of the plurality of objects into segmented objects;
      assign metadata to a segmented object, wherein to assign metadata to a segmented object includes to:
         compare characteristics of the segmented object with characteristics of objects stored in a database, and
         upon a positive match, assign the metadata to the segmented object and store the metadata as assigned to the segmented object in the database, wherein the metadata comprises information on a 3D measure of an object;
      determine a three-dimensional (3D) measure of each of the plurality of objects, wherein the 3D measure of the segmented object is determined from the metadata;
      calculate a total 3D measure for the plurality of objects; and
      compare the total 3D measure for the plurality of objects with inner dimensions of a set of potential storage boxes to determine one or more candidate storage boxes for storing the plurality of objects.

14. The computing device of claim 13, further comprising:
a range sensor configured to scan the plurality of objects to be stored thereby to add range information to the scan of the plurality of objects, wherein to determine a 3D measure of a segmented object is further made based on the range information associated with the segmented object.

15. The computing device of claim 13, further comprising:
a display configured to present a scheme to organize a particular group of objects to be stored in a storage box such that they fit into the storage box.

16. The computing device of claim 13, further comprising:
a display configured to present a representation of the one or more candidate storage boxes having objects of the group of objects stored therein.

17. A computer implemented method for determining one or more storage boxes for storing objects, the method comprising:
scanning, by an imaging sensor, a plurality of objects, to acquire a scan of the plurality of objects;
segmenting the scan of the plurality of objects into segmented objects;
determining a three-dimensional (3D) measure of each of the segmented objects;
grouping the segmented objects into one or more groups of objects, wherein grouping the objects into the one or more groups of objects comprises:
categorizing the segmented objects; and
grouping the segmented objects belonging to a same object category into one of the one or more groups of objects; and
determining, for a group of objects of the one or more groups of objects, one or more candidate storage boxes for storing the group of objects by:
calculating a total 3D measure for the group of objects by combining the 3D measure of each object of the group of objects;
comparing the total 3D measure for the group of objects with inner dimensions of a set of potential storage boxes; and
selecting the set of potential storage boxes from a group of storage boxes based on the object category of the objects in the group of objects and/or an appearance of boxes of the group of storage boxes.

18. The method according to claim 17, further comprising:
assigning metadata to a segmented object by:
comparing characteristics of the segmented object with characteristics of objects stored in a database, and upon a positive match, assigning the metadata to the segmented object and storing the metadata as assigned to the segmented object in the database.

19. The method according to claim 18, wherein the metadata comprises information on an object category, and grouping the segmented object into the one or more groups of objects is based on the object category.

20. The method according to claim 17, further comprising:
scanning, by a range sensor, the plurality of objects to be stored thereby adding range information to the scan of the plurality of objects,
wherein determining the 3D measure of a segmented object is made based on the range information associated with the segmented object.

21. The method according to claim 17, wherein at least some of the segmented objects are categorized using a neural network trained to categorize objects based on a plurality of images of home environments.

22. The method according to claim 17, wherein determining the one or more candidate storage boxes further comprises:
identifying storage boxes comprising objects corresponding to the group of objects from a plurality of images of home environments,
wherein selecting the set of potential storage boxes from the group of storage boxes is further based on the identified storage boxes.

23. The method according to claim 17, wherein the one or more candidate storage boxes comprises a set of different storage boxes, each box in the set of different boxes having a different appearance, the method further comprising:
displaying a representation of each of the one or more candidate storage boxes on a display; and
receiving user input selecting at least one storage box among the one or more candidate storage boxes.

24. The method according to claim 17, the method further comprising:
calculating a total volume for the group of objects;
determining whether the group of objects fits into one storage box based on the total volume for the group of objects; and
splitting the group of objects into a plurality of boxes when it is determined that the group of objects does not fit into the one storage box.

25. The method according to claim 24, further comprising:
subgrouping the group of objects into subgroups until each of the subgroups fit into an individual one of the one or more candidate storage boxes.

26. The method according to claim 17, further comprising:
displaying on a display a scheme to organize the group of objects to be stored in a storage box such that they fit into the storage box.

27. The method according to claim 17, further comprising:
displaying on a display a representation of the one or more candidate storage boxes having objects of the group of objects stored therein.

28. A computing device comprising:
an imaging sensor;
a processor;
a memory device storing instructions which, when executed by the processor cause the computing device to:
scan, by the imaging sensor, a plurality of objects to be stored to acquire a scan of the plurality of objects;
segment the scan of the plurality of objects into segmented objects;
determine a three-dimensional (3D) measure of each of the plurality of objects;
group the segmented objects into one or more groups of objects, wherein to group the objects into the one or more groups of objects includes to:
categorize the segmented objects; and
group the segmented objects belonging to a same object category into one of the one or more groups of objects;

calculate a total 3D measure for the plurality of objects;
compare the total 3D measure for the plurality of objects with inner dimensions of a set of potential storage boxes to determine one or more candidate storage boxes for storing the plurality of objects; and
select the one or more candidate storage boxes based on the object category of the objects in the group of objects and/or an appearance of boxes of the one or more candidate storage boxes.

29. The computing device of claim 28, further comprising:
a range sensor configured to scan the plurality of objects to be stored thereby to add range information to the scan of the plurality of objects, wherein to determine a 3D measure of a segmented object is made based on the range information associated with the segmented object.

30. The computing device of claim 28, further comprising:
a display configured to present a scheme to organize a particular group of objects to be stored in a storage box such that they fit into the storage box.

31. The computing device of claim 28, further comprising:
a display configured to present a representation of the one or more candidate storage boxes having objects of the group of objects stored therein.

32. The computing device of claim 28, wherein the instructions are further configured to cause the computing device to:
assign metadata to a segmented object, wherein to assign the metadata to the segmented object includes to:
compare characteristics of the segmented object with characteristics of objects stored in a database, and
upon a positive match, assign the metadata to the segmented object and store the metadata as assigned to the segmented object in the database.

33. A computer implemented method for determining one or more storage boxes for storing objects, the method comprising:
scanning, by an imaging sensor, a plurality of objects, to acquire a scan of the plurality of objects;
segmenting the scan of the plurality of objects into segmented objects;
determining a three-dimensional (3D) measure of each of the segmented objects;
grouping the segmented objects into one or more groups of objects; and
determining, for a group of objects of the one or more groups of objects, one or more candidate storage boxes for storing the group of objects by:
calculating a total 3D measure for the group of objects by combining the 3D measure of each object of the group of objects;
identifying storage boxes comprising objects corresponding to the group of objects from a plurality of images of home environments;
selecting a set of potential storage boxes from a group of storage boxes based on the identified storage boxes; and
comparing the total 3D measure for the group of objects with inner dimensions of the set of potential storage boxes.

34. The method according to claim 33, further comprising:
assigning metadata to a segmented object by:
comparing characteristics of the segmented object with characteristics of objects stored in a database, and
upon a positive match, assigning the metadata to the segmented object and storing the metadata as assigned to the segmented object in the database.

35. The method according to claim 34, wherein the metadata comprises information on an object category, and grouping the segmented object into the one or more groups of objects is based on the object category.

36. The method according to claim 33, further comprising:
scanning, by a range sensor, the plurality of objects to be stored thereby adding range information to the scan of the plurality of objects,
wherein determining a 3D measure of a segmented object is made based on the range information associated with the segmented object.

37. The method according to claim 33, wherein grouping the objects into the one or more groups of objects further comprises:
categorizing the segmented objects; and
grouping the segmented objects belonging to a same object category into one of the one or more groups of objects.

38. The method according to claim 37, wherein at least some of the segmented objects are categorized using a neural network trained to categorize objects based on a plurality of images of home environments.

39. The method according to claim 33, wherein the one or more candidate storage boxes comprises a set of different storage boxes, each box in the set of different boxes having a different appearance, the method further comprising:
displaying a representation of each of the one or more candidate storage boxes on a display; and
receiving user input selecting at least one storage box among the one or more candidate storage boxes.

40. The method according to claim 33, the method further comprising:
calculating a total volume for the group of objects;
determining whether the group of objects fits into one storage box based on the total volume for the group of objects; and
splitting the group of objects into a plurality of boxes when it is determined that the group of objects does not fit into the one storage box.

41. The method according to claim 40, further comprising:
subgrouping the group of objects into subgroups until each of the subgroups fit into an individual one of the one or more candidate storage boxes.

42. The method according to claim 33, further comprising:
displaying on a display a scheme to organize the group of objects to be stored in a storage box such that they fit into the storage box.

43. The method according to claim 33, further comprising:
displaying on a display a representation of the one or more candidate storage boxes having objects of the group of objects stored therein.

44. A computing device comprising:
an imaging sensor;
a processor;
a memory device storing instructions which, when executed by the processor cause the computing device to:
scan, by the imaging sensor, a plurality of objects to be stored to acquire a scan of the plurality of objects;
segment the scan of the plurality of objects into segmented objects;
determine a three-dimensional (3D) measure of each of the plurality of objects;
calculate a total 3D measure for the plurality of objects;
identify storage boxes comprising objects corresponding to the plurality of objects from a plurality of images of home environments;
select a set of potential storage boxes from a group of storage boxes based on the identified storage boxes; and
compare the total 3D measure for the plurality of objects with inner dimensions of the set of potential storage boxes to determine one or more candidate storage boxes for storing the plurality of objects.

45. The computing device of claim 44, further comprising:
a range sensor configured to scan the plurality of objects to be stored thereby to add range information to the scan of the plurality of objects, wherein to determine a 3D measure of a segmented object is made based on the range information associated with the segmented object.

46. The computing device of claim 44, further comprising:
a display configured to present a scheme to organize a particular group of objects to be stored in a storage box such that they fit into the storage box.

47. The computing device of claim 44, further comprising:
a display configured to present a representation of the one or more candidate storage boxes having objects of the group of objects stored therein.

48. The computing device of claim 44, wherein the instructions are further configured to cause the computing device to:
assign metadata to a segmented object, wherein to assign the metadata to the segmented object includes to:
compare characteristics of the segmented object with characteristics of objects stored in a database, and
upon a positive match, assign the metadata to the segmented object and store the metadata as assigned to the segmented object in the database.

49. A non-transitory computer-readable storage medium having stored thereon instructions which, when executed on a device having processing capabilities, cause the device to:
scan, by the imaging sensor, a plurality of objects to be stored to acquire a scan of the plurality of objects;
segment the scan of the plurality of objects into segmented objects;
determine a three-dimensional (3D) measure of each of the plurality of objects;
calculate a total 3D measure for the plurality of objects;
compare the total 3D measure for the plurality of objects with inner dimensions of a set of potential storage boxes to determine one or more candidate storage boxes for storing the plurality of objects, wherein the one or more candidate storage boxes comprises a set of different storage boxes, each box in the set of different boxes having a different appearance;
display a representation of each of the one or more candidate storage boxes on a display; and
receive user input selecting at least one storage box among the one or more candidate storage boxes.

* * * * *